(12) United States Patent
Bouvy

(10) Patent No.: US 10,858,990 B2
(45) Date of Patent: Dec. 8, 2020

(54) INTERNAL COMBUSTION STEAM ENGINE

(71) Applicant: DMA TECH S.À R.L., Hobscheid (LU)

(72) Inventor: Jacques Bouvy, Battincourt (BE)

(73) Assignee: DMA TECH S.À R.L., Hobscheid (LU)

( * ) Notice: Subject to any disclaimer, the term of this patent is extended or adjusted under 35 U.S.C. 154(b) by 0 days.

(21) Appl. No.: 16/340,061

(22) PCT Filed: Oct. 6, 2017

(86) PCT No.: PCT/EP2017/075523
§ 371 (c)(1),
(2) Date: Apr. 5, 2019

(87) PCT Pub. No.: WO2018/065594
PCT Pub. Date: Apr. 12, 2018

(65) Prior Publication Data
US 2020/0056535 A1    Feb. 20, 2020

(30) Foreign Application Priority Data

Oct. 7, 2016  (LU) .......................................... 93252
Jan. 17, 2017  (LU) ........................................ 100022

(51) Int. Cl.
*F02B 47/02* (2006.01)
*F02M 57/04* (2006.01)
(Continued)

(52) U.S. Cl.
CPC .............. *F02B 47/02* (2013.01); *F02D 37/00* (2013.01); *F02M 25/022* (2013.01);
(Continued)

(58) Field of Classification Search
CPC .......... F02B 47/02; F02B 47/00; F02B 47/06; F02D 37/00; F02M 57/04; F02M 25/022;
(Continued)

(56) References Cited

U.S. PATENT DOCUMENTS 3,696,795 A * 10/1972 Smith ....................... F01N 3/04
                                                          123/1 A
4,805,571 A    2/1989 Humphrey
(Continued)

FOREIGN PATENT DOCUMENTS

CN        205445830 U    8/2016
DE    102012107714 A1    2/2013
(Continued)

OTHER PUBLICATIONS

EP Examination Report dated Feb. 4, 2020 re: Application No. 17 786 880.9, pp. 1-6, citing: WO 99/42718 A1, DE 10 2012 107714 A1 and U.S. Pat. No. 4 805 571 A.
(Continued)

*Primary Examiner* — Jacob M Amick
(74) *Attorney, Agent, or Firm* — Cantor Colburn LLP

(57) ABSTRACT

A sparked reciprocating internal combustion two-stroke steam engine including an engine casing, a crankshaft rotatable about a crankshaft axis, a cylinder arranged inside the engine casing, a piston 1 arranged inside the cylinder to movably reciprocate along a reciprocating axis between a top dead center position distal from the crankshaft and a bottom dead center position proximal to the crankshaft and operatively connected to the crankshaft such that the reciprocating piston imparts a rotational movement to the crankshaft, a combustion chamber defined within the cylinder between the engine casing and a head of the piston opposite the crankshaft, an intake valve, an exhaust valve, a fuel injector to directly inject fuel into the combustion chamber, (Continued)

a water injector to directly inject water into the combustion chamber at a location below the top dead center position of the piston, and a spark plug, where the intake valve is in fluid connection with a compressed gaseous oxidizer supply configured to feed compressed gaseous oxidizer through the intake valve to the combustion chamber.

24 Claims, 3 Drawing Sheets

(51) Int. Cl.
*F02M 25/022* (2006.01)
*F02D 37/00* (2006.01)
*F02M 25/025* (2006.01)
*F02M 25/03* (2006.01)

(52) U.S. Cl.
CPC ...... *F02M 25/025* (2013.01); *F02M 25/0221* (2013.01); *F02M 25/0222* (2013.01); *F02M 25/03* (2013.01); *F02M 57/04* (2013.01)

(58) Field of Classification Search
CPC .......... F02M 25/0221; F02M 25/0222; F02M 25/0224; F02M 25/025; F02M 25/028; F02M 25/03; F02M 25/032; F02M 25/038
See application file for complete search history.

(56) References Cited

U.S. PATENT DOCUMENTS

| | | | | |
|---|---|---|---|---|
| 5,727,520 | A | * | 3/1998 | Wirth .................... F02B 23/101 |
| | | | | 123/301 |
| 2010/0229806 | A1 | | 9/2010 | Kemeny |
| 2013/0054119 | A1 | * | 2/2013 | Yokota ................... F02M 25/03 |
| | | | | 701/104 |
| 2015/0354437 | A1 | * | 12/2015 | Mulye ..................... F02B 47/02 |
| | | | | 123/25 C |
| 2018/0073468 | A1 | * | 3/2018 | Wilson ...................... F01N 3/10 |

FOREIGN PATENT DOCUMENTS

| | | |
|---|---|---|
| EP | 3081790 A1 | 10/2016 |
| JP | H08296441 A | 11/1996 |
| JP | 2001082259 A | 3/2001 |
| WO | 9942718 A1 | 8/1999 |
| WO | 2014132125 A2 | 9/2014 |

OTHER PUBLICATIONS

International Search Report dated Nov. 17, 2017 re: Application No. PCT/EP2017/075523, pp. 1-3, citing: JP H08 296441 A, EP 3 081 790 A1, JP 2001 082259 A and WO 2014/132125 A2.
Written Opinion dated Nov. 17, 2017 re: Application No. PCT/EP2017/075523, pp. 1-5, citing: JP H08 296441 A, EP 3 081 790 A1, JP 2001 082259 A and WO 2014/132125 A2.
International Preliminary Report on Patentability dated Dec. 11, 2018 re: Application No. PCT/EP2017/075523, pp. 1-5.

* cited by examiner

INTERNAL COMBUSTION STEAM ENGINE

TECHNICAL FIELD

The present disclosure relates to internal combustion steam engines and in particular to internal combustion steam engines with enhanced efficiency, low pollution and high torque at low RPM, as well as to a method for operating the same.

BACKGROUND

Steam engines and internal combustion engines have been used to produce mechanical rotary power for more than one hundred and fifty years. The current steam engine, based upon a reciprocating piston, was made possible by James Watt coupling the low power reciprocating engine with a condenser, which allowed for expansion of the steam to a pressure lower than atmospheric, thereby increasing its efficiency. The introduction of the steam turbine allowed for greater efficiency and expansion to pressures of a couple of inches of Mercury in our gravitational system. However, steam engines of a reciprocating type were used in the railroad industry throughout the $20^{th}$ century whenever high torques at low RPM were needed to carry large loads over steep grades. Steam engines can burn any type of fuel in producing power although they normally utilize coal or natural gas. They are limited in that they require an external boiler to raise the steam to a superheated condition. The superheated steam is often below the temperature of the fuel that is combusted in the boiler as the transfer of heat to water requires either a significant temperature difference or large heat transfer surfaces. Thus, except for the generation of electrical power and some systems where both process steam coupled with mechanical power are required, steam engines are not widely used. Steam engines produce higher torque than conventional combustion engine.

Today's transportation needs are primarily powered by internal combustion engines. Although the development of lithium batteries have made electric cars appropriate for urban use or travel distances less than 200 miles, modern transportation engines include those based on the Otto Cycle, the Diesel Cycle, the Brayton Cycle and the Air Standard Cycle for Jet Propulsion.

For land-based transportation systems, small boats and propeller driven small aircrafts, various forms of the Otto Cycle are used.

In electrical generating systems, where wind and solar units are not practical, internal combustion units of either Diesel or Otto cycles are likely.

On farms and dairies where methane gas from manure is available, or propane is accessible, an Otto Cycle based engine could be used.

Thus, despite the environmental needs to use less hydrocarbon fuels, engines based on the Otto Cycle will be likely to be prominent for at least the next 20 years worldwide. It is therefore important that we seek engine designs that minimize air pollution while maximizing efficiency.

Both Diesel and Otto Cycle engines are commonly referred to as air standard cycles. This is because the main oxidizer for the fuel is air taken from our atmosphere (air is considered free and only the fuel costs). However the nitrogen contained in the air leads to $NO_x$ formation which must in turn be treated.

Most Otto Cycle Engines are four-stroke engines. They use gasoline, propane or natural gas (methane) as fuels, the oxidizer being air. In order to avoid knock (uncontrolled combustion) they are run lean (more air than needed to burn the fuel). This leads to the formation of $NO_x$ and also may lead to incomplete combustion (CO formation). Both are greenhouse gases. Most modern cars have direct fuel injection to prevent the possibility of unburned hydrocarbons.

A significant number of small engines are so-called two-stroke engines. These have been used in outboard motors, scooters, model airplanes, yard equipment, etc. They are normally less than 1000 $cm^3$. Typically they use the crankcase as a separate chamber to take in and compress the air that is fed to the cylinder. When the piston moves downward in the cylinder it compresses the air-fuel-oil mixture in the crankcase. When it nears the end of the stroke, it opens a valve to the cylinder and the compressed air-fuel-oil mixture moves into the cylinder (combustion chamber) while the exhaust valve is still open. This loses some hydrocarbons to the atmosphere. Apparently, no $NO_x$ catalytic treatment for two-stroke engines has been proposed so far. Some manufacturers of two-stroke engines are starting to use direct injection fuel systems. This will eliminate the dumping of raw hydrocarbons into the atmosphere, but they have not been able as yet to resolve the $NO_x$ problem at a sufficiently low cost to make it practical.

Some work has been done over the years to utilize $H_2$ as a fuel and testing by NASA and the USDOE in California has indicated lower $NO_x$ formation with direct injection in a four-stroke engine by modifying the number of nozzle ports of the injectors.

BRIEF SUMMARY

In view of the above, the present disclosure provides an improved internal combustion engine which is more efficient and less polluting than known engines, as well as a method for operating such an engine.

The present disclosure proposes in a first aspect a sparked reciprocating internal combustion two-stroke steam engine comprising an engine casing, a crankshaft rotatable about a crankshaft axis, a cylinder arranged inside said engine casing, a piston arranged inside said cylinder to movably reciprocate along a reciprocating axis between a top dead center position distal from said crankshaft and a bottom dead center position proximal to said crankshaft and operatively connected to the crankshaft such that the reciprocating piston imparts a rotational movement to the crankshaft, a combustion chamber defined within said cylinder between the engine casing and a head (or top) of the piston opposite said crankshaft, an intake valve, an exhaust valve, a fuel injector (arranged) to directly inject fuel into said combustion chamber, a water injector (separate from the fuel injector) (arranged) to directly inject water into said combustion chamber at a location below said top dead center position of the (head/top of the) piston and a spark plug, wherein the intake valve is in fluid connection with a compressed gaseous oxidizer supply configured to feed compressed gaseous oxidizer through the intake valve to the combustion chamber.

In a further aspect, the disclosure also proposes a method of operating a sparked reciprocating two-stroke internal combustion engine as disclosed herein.

The engine of the disclosure is first of all a two-stroke steam engine, meaning that power is produced by igniting a fuel oxidizer mix in a same cylinder at each cycle of rotation of the crankshaft. This becomes possible by shifting the action of compression of the oxidizer (air or oxygen) to an auxiliary compressing device (which is not part of the engine), meaning that the oxidizer is fed under an already compressed state to the cylinder instead of compressing it inside the cylinder or below the cylinder as in conventional two-stroke engines. Hence the compression before ignition of the fuel does not take place in nor with the help of the cylinder, but the oxidizer is provided in a sufficiently compressed state. The main advantage of the engine being a two-stroke engine is of course that compared to an equivalently powered four-stroke, the engine may be much smaller; or alternatively, at the same size, the engine can theoretically provide double the power.

Second, the engine of the disclosure although being an internal combustion engine, more importantly also is a steam engine, hence the name of internal combustion steam engine or ICSE. In fact, in an engine of the disclosure, the heat produced by the combustion is immediately used after the latter is completed to evaporate water timely injected after essential completion of the combustion by dedicated water injectors, thereby producing higher gas pressure and thus more power to the rotating crankshaft. As the temperature of the superheated steam decreases, the pressure inside the cylinders increases. The injection of appropriate quantities of water has been shown to provide about 5% more power than the combustion of the fuel alone. But there is a still further important advantage to injecting water immediately after the combustion happened: the water evaporated by the heat inside the cylinder reduces the temperature in the combustion chamber, thereby significantly reducing heat strain of the cylinder block and cylinder head, in particular compared to conventional two-stroke engines where ignition takes place at each cycle. Even more, due to the immediate cooling caused by the evaporation of the injected water, the overall cooling of the engine may be simplified, which in turn reduces the weight of the engine. Additionally, injecting water rather than steam is an easier process and uses more reliable (and cheaper) components, and requires less work.

A third important advantage of the disclosure if the oxidizer is air (thus mainly nitrogen) is that due to the injection of water immediately after the combustion, there results a rapid reduction of the temperature inside the combustion chamber, which significantly reduces the risk of the formation of environmentally harmful $NO_x$. This in turn reduces the need for complex systems and additives to reduce the $NO_x$ back to $N_2$ (in order to meet corresponding national and international regulations).

A fourth advantage of the disclosure is that unlike in a conventional ICE where the peak torque occurs immediately after the combustion is completed at a small angle after sparking, the steam engine maximum torque occurs after all of the injected water has turned to superheated steam and thereby where the lever arm is significantly greater.

The expression "top dead center" and "bottom dead center" are generally known expressions in the art of reciprocating engines and refer to both end positions of the piston, or more particularly the top of the piston, within the cylinder along the reciprocating axis. The top dead center is the position of the piston when it is distal from the crankshaft, whereas the bottom dead center is the position proximal to the crankshaft. Positions along the reciprocating axis are generally given in degrees)(° from either dead center, relative to and in the sense of rotation of the crankshaft. Often the above expressions are preceded by the preposition "after" or "before". For example: "5° before top dead center" (shortens to 5° btdc) means that the top of the piston is at a position along the reciprocating axis which corresponds to a rotation angle of the crankshaft at −5° relative to the top dead center. A notation of a range between "−5° to +5° from top dead center" is equivalent to "from 5° before top dead center to 5° after top dead center" or "5° btdc to 5° atdc".

Further preferred features and advantages of the disclosure will be described below in relation with the ICSE and the method of operating the same.

As already suggested above, the compressed gaseous oxidizer supplied is generally compressed oxygen or compressed air. Normally an engine uses compressed air associated with volumetric ratios of air at the bottom of the stroke to the top of the stroke compressed isentropically at compression ratios preferably of at least 8:1, more preferably of at least 10:1, still more preferably of at least 12:1.

The intake valve(s) and the exhaust valve(s) may be any appropriate type of valve, preferably these are independently poppet valves used in almost all four stroke engines, sliding valves or rotating disk valves, being either driven by the engine itself (the engine thus being the actuator), such as by camshafts, or driven by separate actuators, such as pneumatic, hydraulic or electric actuators. For example, a valve system designed as a slide or spinning disk may advantageously allow for a set timing of the opening and closing of the exhaust valve at bottom dead center and opening of the intake valve prior to the closing of the exhaust valve.

The ICSE of the disclosure may further comprise an actuator configured for opening the intake valve to feed compressed oxidizer when the head of the piston is at a reciprocating position at 90° to 20°, preferably 35° to 25°, more preferably about 30° before top dead center and configured for closing said intake valve at 10° to 2°, preferably about 5° before top dead center. Preferably, the ICSE also comprises an actuator configured for opening the exhaust valve to evacuate exhaust gases when the top of the piston is at a reciprocating position between −21° to +15°, preferably at −10° to +5°, more preferably at 0°, from bottom dead center and configured for closing said exhaust valve at 25° to 5°, preferably at 20° to 10°, more preferably about 15° before top dead center.

The fuel that may be used to feed the engine of the disclosure may be any conventional fuel, which is liquid or gaseous at normal conditions, such as hydrogen, hydrocarbons or related oxygen-containing molecules. In particularly preferred embodiments, the engine of the disclosure is operated with fuel that is gaseous at normal conditions. In particular, preferred fuels are selected among hydrogen; methane, ethane, propane, butane or natural gas.

In particularly preferred embodiments of the disclosure, the fuel injector(s) is/are configured for injecting fuel between −5° to +5°, preferably at 0° from top dead center and the spark plug is configured for sparking immediately after closing of the fuel injector.

The dedicated water injector(s) is/are advantageously configured for injecting water into the combustion chamber at 5° to 40°, preferably at 7.5° to 30° after top dead center.

In most preferred embodiments, air as the oxidizer and $H_2$ as the fuel, the mass of water injected into the combustion chamber represents 0.8 to 1.5, preferably 0.9 to 1.2 of the mass of the combustion gases inside the combustion chamber (i.e. after step (c) as indicated above). These values were calculated for air as the oxidizer. For $O_2$ as the oxidizer, higher volumes of water are preferred, in particular up to 4 or 5 times the mass of the combustion products (or even more). The ICSE of the disclosure generally further comprises a water tank as a water supply to feed the water injector, as well as a condenser unit downstream of the exhaust valve. This condenser unit, e.g. a heat exchanger, can be provided to condense the steam from the exhaust gas to water, which may then be fed through conducts to the water tank. Such a recycling of the water used for the steam production is of particular interest for mobile application of the ICSE where the quantities of carried water should usually be limited. Furthermore, recycling the water also reduces the number of water refills. There may also be provided filtering means to filter the exhausted steam. The water tank is preferably designed for both water filling by a normal filling cap and the filling by the condensed exhausted water.

The ICSE of the disclosure further preferably comprises a control unit configured to control one or more features of the engine or the operating method, such as the intake valve opening and closing, the exhaust valve opening and closing, the timing and quantity of fuel injection, the timing and quantity of water injection, the oxidizer pressure, the ignition timing, an external compressor, etc. In general, the control unit will provide means for appropriately controlling the engine functioning and performance consisting in a dedicated software aimed at controlling at the same time valve timing, air mass and pressure injection, fuel injection quantity and timing, sparking, water injection quantity and timing, water injection specifications at beginning and end of engine duty, etc.

The ICSE of the disclosure may of course be composed of a plurality of cylinders in the same way as conventional ICEs. Furthermore, each of these cylinders may comprise a plurality of water injectors preferably distributed along a perimeter of the combustion chamber. The water injectors may be located at any position of the cylinder which is situated inside the combustion chamber. As the piston moves downward due to the ignition of the fuel/oxidizer mix, the water can be injected generally when the piston head is located at a position about 5° to 35° after top dead center. As the water injectors have access to the combustion chamber, they are preferably situated in a region between the top dead center and the position of the top of the piston when the crankshaft is at an angle of rotation of >0 to 35°, preferably of 5 to 25° relative to the top dead center position.

Alternatively or additionally, the ICSE of the disclosure may comprise a plurality of water injectors situated at different locations relative to the reciprocating axis, i.e. at different levels from the top dead center, either stacked along the reciprocating axis or obliquely relative to said axis. In particularly preferred embodiments, the water injection of each of said plurality of water injectors can be controlled separately, e.g. depending on the speed of rotation of the engine.

The one or more water injectors are preferably arranged to inject water in the form of a fine mist at high pressures, generally by using high pressure pump operating at pressures of 350-400 bar. The water injectors are preferably arranged so that their spraying characteristics and location around the cylinder head will ensure complete spraying of the water injected after combustion, yielding a fine mist coupled to an angled spray pattern consistent with the flame motion characteristics after combustion, e.g. an angle greater than 90° relative to the reciprocating axis in the direction of the top dead center, preferably at an angle between 92.5 and 150°, more preferably between 95 and 130°. In particularly preferred variants of the disclosure, this angle may be controlled and adjusted by a control unit.

While some of the parts of the ICSE of the disclosure are quite similar to corresponding parts known from conventional ICEs, some of these parts may have very particular features, in particular in some most preferred embodiments.

For example, the head of the piston facing the combustion chamber preferably has an inwardly curved surface which will enhance the effects of the formed superheated steam allowing for the best use of the superheated steam characteristics in the aim of obtaining the maximum pressure on the piston during steam expansion The ICSE's casing generally comprises a cylinder head and a cylinder block. The head of the ICSE is preferably designed in such a way as to allow for the pre-heating of a certain quantity of water to be subsequently directly injected into the cylinder after combustion of the fuel/oxidizer mixture. Furthermore, the cylinder head may be advantageously configured to cover the distance of the piston head about 25° of the top dead center. In such a case, the one or more water injectors may be conveniently arranged between the cylinder head and the cylinder block.

The ICSE of the disclosure may comprise more than one spark plug per cylinder or means for multi-spark plug ignition to increase flame speed.

The method of operating the sparked reciprocating two-stroke internal combustion steam engine (ICSE) as described herein, generally comprises running the ICSE by providing fuel, compressed oxidizer and thereafter water once the combustion of the fuel is essentially complete. In particular such a method comprises, at each cycle of the rotation of the crankshaft and the corresponding reciprocating of the piston, the step of (a) opening the intake valve to feed compressed oxidizer when the head of the piston is at a reciprocating position between 90° to 20°, preferably between 35° to 25°, more preferably about 30° before top dead center and closing said intake valve preferably at 10° to 2°, more preferably about 5° before top dead center.

Advantageously, the opening and the closing of the intake valve can be adjusted by a control unit at a value within the ranges given; preferably at each cycle.

Said method generally also comprises, at each cycle of the rotation of the crankshaft and the corresponding reciprocating of the piston, the further step of (b) opening the exhaust valve to evacuate exhaust gas when the head of the piston is at a reciprocating position between −21° to +15°, preferably from −10° to +5°, more preferably 0° from bottom dead center, and closing said exhaust valve between 25° to 5°, preferably about 20° to 10°, more preferably 15° before top dead center position.

Advantageously, the opening and the closing of the exhaust valve can be adjusted by a control unit at a value within the ranges given; preferably at each cycle.

During operation of the ICSE, at each cycle of the rotation of the crankshaft and the corresponding reciprocating of the piston, the method preferably comprises the step of (c) injecting fuel between −5° to +5°, preferably at 0° from top dead center and sparking the spark plug immediately after closing of the fuel injector.

The injection of water in said method can be done, at each cycle of the rotation of the crankshaft and the corresponding reciprocating of the piston, by (d) injecting water into the combustion chamber at 5° to 40°, preferably of 7.5° to 30° after top dead center.

The injection of either fuel or water, or both, can advantageously be adjusted by a control unit within the ranges given; preferably at each cycle.

As a conclusion, it can be said that the ICSE is a steam engine because it uses water as the working fluid that provides a significant part of the work in moving the piston. It is furthermore a two-stroke internal combustion engine in that the oxidizer is either compressed air or compressed oxygen provided from an external source. The oxidizer is provided to the cylinder when the piston is near top dead center, and when the inlet valve is closed, the fuel is directly injected, followed by a spark ignition.

Ignition is attained via the use of sparkplugs, one or more depending on the diameter of the cylinder and an appropriate high voltage automotive coil. Typically one plug is sufficient; however, if the fuel injected into the cylinder does not have a flame speed sufficient to be thoroughly burned before the piston has moved about 25 degrees from top dead center, two or more plugs may be desirable or needed. This is due to ensure that combustion has essentially been completed when the water is added. A control unit will preferably control both the ignition and water addition. The amount of fuel injected is near that for a stoichiometric mixture. At the point where the combustion is (nearly) complete, liquid water is preferably injected into the cylinder through a spacer that fits between the head and the top of the block.

If the fuel is hydrogen and the oxidizer is gaseous oxygen, the media in the engine will be only superheated water and a true internal combustion steam engine in the sense that the exhaust will only contain water.

If the oxidizer is air, superheated water vapor and nitrogen gas as a mixture will be doing the work. Thermodynamic analyses have shown that the addition of water equal to the weight of the air will produce more than 5% more work than an equal mass of air, and without the high $NO_x$ production.

The engine can be designed so that the mixture can be expanded until water starts to condense or the pressure is near atmospheric.

The upward movement of the piston will force the gases and vapor up through the exhaust valve.

Before the piston reaches top dead center while using air as the oxidizer, the intake valve is opened and the oxidizer will help push the remaining gases and water vapor out. (If using oxygen rather than air, the small amount of water that may remain needs not be evacuated prior to shutting off the engine, at which time it should be blown out to avoid possible rust if left unused for a long time.)

The fuel is preferably immediately injected, and when the injector and intake valve close, the engine is sparked to repeat the cycle.

The above process is described for a single cylinder. For a 4-cylinder engine, cylinders 1 and 4 are generally fired together and cylinders 2 and 3 are thus fired together to insure balance of the engine.

As already described above, it is possible to collect the water from the combustion gases and reuse it, using an air or water cooled condenser. Such a system may e.g. be added if the separation system can be achieved for less weight than carrying water for the run time of an engine for a typical tank of fuel. This has the greatest probability when using $O_2$ as the oxidizer. For air as the oxidizer, the non-condensable $N_2$ makes the condenser relatively large. A workable means of separating the $N_2$ and water vapor is through use of a molecular sieve, if one can be made to operate with low power requirements and sufficiently small volume.

For air as the oxidizer, the use of the engine in a vehicle will in principle require a compressor capable of compressing air at the rate necessary for running the engine up to at least 3,000 rpm. The air should be delivered at a rate equal or greater to supplying pressure at or near the mass flow of air required in a four-stroke engine of twice the horsepower. Typically 350 to 400 kPa at ambient temperature will be sufficient. In other words, a four-cylinder two-stroke ICSE would be equivalent to an eight-cylinder four-stroke engine of twice the displacement.

Such a compressor could be driven through a belt or chain system with appropriate sheaves. It could also be driven by an electrical motor.

The air supply system will generally require a storage tank, which would supply the pressurized air at local ambient temperature within the engine compartment, so that it would equal one time to two times the mass flow rate in a four-stroke engine.

With regards to the valves system of the engine, conventional poppet valves may be used, but the opening might be too limited. The ICSE may instead use a sliding or a rotating disk valve that includes ports for both the exhaust and intake flows. The valve plate can provide the overlap mentioned above in terms of the valves opening and closing and thereby simplify the control.

This will also more easily enable electronic or computer control of the engine and eliminate the need of a cam to control the valves.

Testing with different fuels may require the use of different valve timings, e.g. by simply changing the plate or by modifying the control parameters within the control unit. However, it is believed that a single design for $H_2$ will suit any of the gaseous fuels mentioned.

All explicit values provided herein should be understood as approximate values unless explicitly otherwise stated. Hence, each of said explicit values should be understood as comprising a range of values of between 10% below and 10% above said value. Explicit values preceded by the word "about", "approximately" or similar should be understood as comprising a range of values of between 20% below and 20% above said values.

BRIEF DESCRIPTION OF THE DRAWINGS

Preferred embodiments of the disclosure will now be described with reference to the accompanying drawings in which.

DETAILED DESCRIPTION

The description below describes some embodiments and variants of an ICSE and of a method of operating an ICSE according to the disclosure. The below description is not intended to limit the scope of the appended claims but rather to illustrate some currently preferred implementations of the disclosure.

Figure 1:
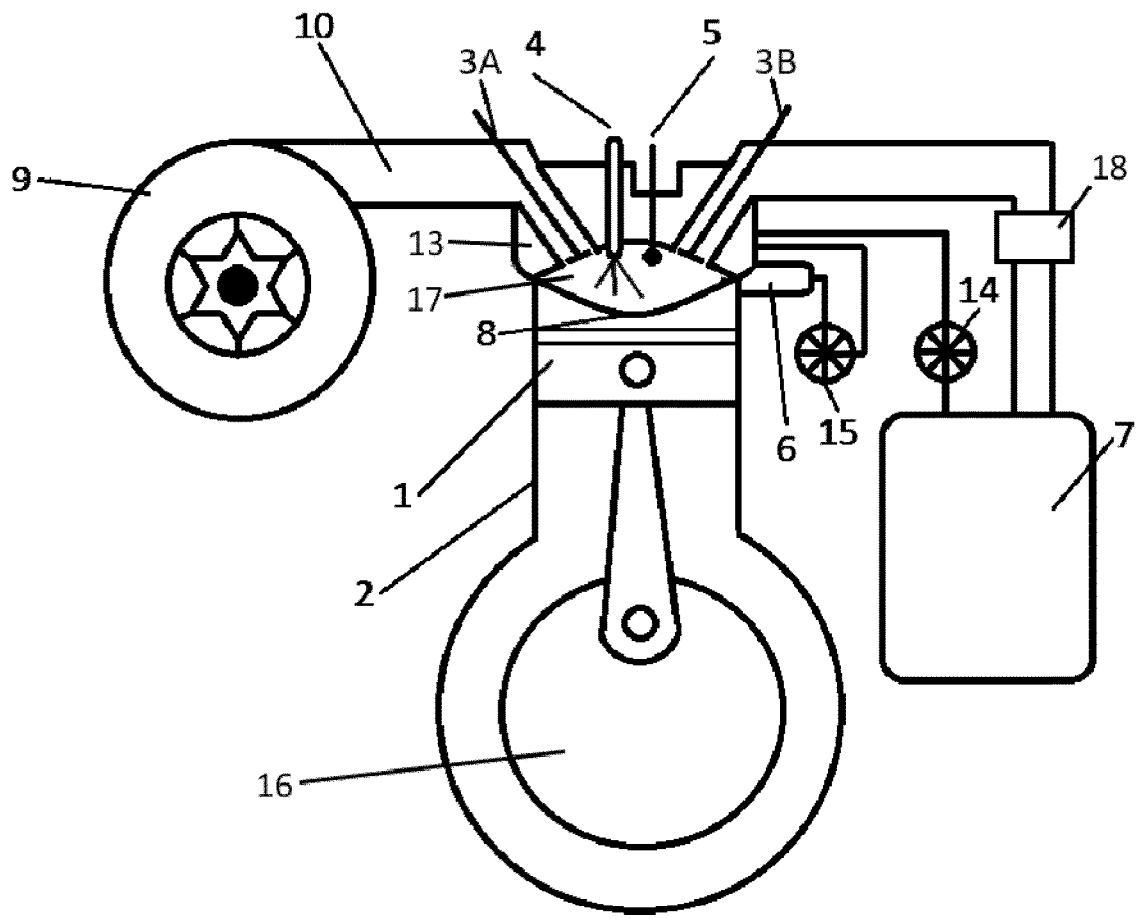
FIG. 1: is a cross sectional view of an embodiment of an ICSE according to the disclosure
Figure 4:
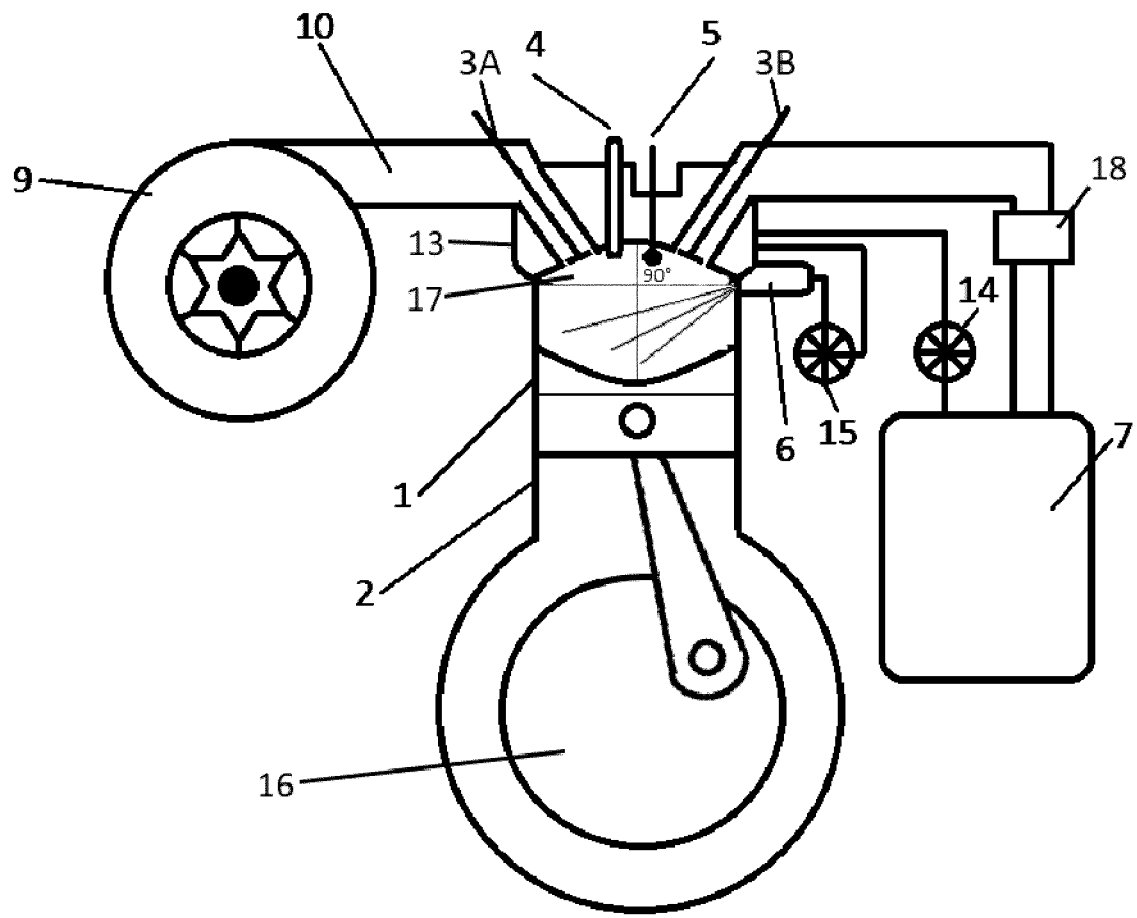
FIG. 4: illustrates a particularly preferred embodiment of a water injection pattern inside a cylinder in an ICSE of FIG. 1

As also illustrated on FIGS. 1 and 4, the internal combustion steam engine (ICSE) itself is composed of a number of components similar to those known in internal combustion engines. It has an engine casing preferably made of a uniquely designed cylinder head, a somewhat standard cylinder block, and one or more pistons 1 that are attached to a crankshaft 16 to the effect of changing the reciprocating motion of the piston 1 to rotary motion of the crankshaft 16.

While a standard gasoline engine has four strokes, namely: 1) an intake stroke which draws air into the engine with the downward motion of the piston through an intake valve by creating a vacuum and, 2) a compression stroke upon closing of the valve at the bottom of the stroke, compresses the air adiabatically during an upward stroke of the piston, the internal combustion steam engine uses an intake of externally compressed oxidizer (air or oxygen) through one or more intake valves 3A opening before top dead center (btdc) and closing at top dead center (tdc) at the latest. The expressions "compressed oxidizer", "compressed air" or "compressed oxygen" in the context of the present disclosure means that the oxidizer, air or oxygen is compressed at a MAP (Manifold Absolute Pressure) of at least 4 to 7 bar or more, preferably at least 5, more preferably at least 6 bar. Higher pressures allow feeding higher quantities of oxidizer. Introducing air compressed separately from the engine results in comparatively lower intake temperature than if the air compression was obtained by compression taking place within the engine by isentropic compression. This will result in higher intake air mass per volume while the lower intake air temperature will reduce the possibility of fuel self-ignition. This will allow in turn the use of higher compression ratios. These will have a direct effect on combustion temperature and on the quantity of water vaporized, and generally, on engine efficiency and power. The compressed oxidizer supply 9 system is unique as its gas temperature is not a function of the engine's own operating temperature, but rather, on the compressed oxidizer supply itself, comprising e.g. a compressor and cooling system itself. A compressor as described in further detail below is preferably electronically coupled to the engine through sensors, which will provide information e.g. on combustion temperature as well as on water vaporized. These parameters will preferably be computed by a dedicated program run by a control unit (ICSE control unit, not represented), which will in turn cause the compressor to generate not only the necessary air mass, but also the required air pressure. Oxidizer (air or $O_2$) MAP pressure should be preferably comprised between 4 and 7 bar. As already indicated, preferred compressor control and components will be described below in a separate description.

The valve 3A and 3B design preferably allows for the incoming air to sweep the exhaust gases totally from the cylinder. The openings in the head will preferably be circular tear shaped shell concavities to direct the incoming air to move away from the exhaust port and flow around combustion chamber 17 and push the exhaust gases out, preferably using a similar tear shaped concavity to direct the air and exhaust gases out the exit port.

While the ICSE may utilize poppet valves 3A, 3B, this type of valves generally limit the minimum distance that must be provided below the top of the cylinder. Other types of valves can be used to overcome this possible problem. Either a rotating disk or a sliding plate type of valve can be advantageously used. These types of valves allow the piston 1 to come very close to the top of the cylinder. Potentially, they can be run by the ICSE control unit through the use of actuators, such as solenoids. Alternatively, they can also be run off of an overhead cam shaft with linkage designed to rotate the disk which would be opposed by a spring, or in the case of a bar type slide to be activated directly by the cam and, again an opposing spring to return the valve to its initial closed position. The sliding valve or disk can be designed to be flat with the upper surface of the cylinder. Such a design would be constructed with its lateral dimension narrower on the surface facing the piston and wider at the top minimizing any possibility of leakage around the sides of the slide or circumference of the disk.

Conversely the slide can be at a small distance above the top of the cylinder. In the latter case, the top of the cylinder can have very shallow concavities of a tear drop shape to direct the flow of the exhaust and incoming air. When the valve openings are overlapping in time, the incoming air can help sweep all of the exhaust combustion gases from the chamber. For this situation, the ICSE can be operated with a pressure where the gases at bottom dead center (where the exhaust valves open) are at a pressure of either ambient or at a point where the water vapor has reached incipient condensation.

In both the internal combustion engine and the ICSE, the fuel can be injected through jets 4 located in the head at top dead center where the oxidizer (air or $O_2$) and fuel are ignited via one or more spark plugs 5. (In older internal combustion engines a carburetor would have sprayed a liquid fuel into the low-pressure air when it entered the engine, leaving the motor subject to pre-ignition knock. For this reason current internal combustion engines are run lean.) The ICSE preferably only uses gaseous fuels such as hydrogen, methane or propane, which are injected preferably from one or more, such as four or more jets and would not be subject to knock even though engine will be run stoichiometrically.

The heat added to the water to generate the steam at the elevated pressure is the enthalpy at that pressure minus the enthalpy of the liquid water at the saturated condition at 400 kPa. The work performed by the expansion is the enthalpy at the high pressure minus the enthalpy at the exhaust. The efficiency of the steam expansion process is the work divided by the heat added. The heat added is obtained from the combustion gases of the fuel/air or oxygen which is mixed with the water to be turned to steam to drive the engine piston.

In a particularly preferred embodiment, the shape of the combustion chamber formed by the head and the top of the preferably slightly concave piston surface at top dead center will form an ellipse of revolution around its minor axis (8). This will result in the high-speed gaseous fuel jet to mix more thoroughly moving the gases upward as well as radially outward making for better mixing with the oxidizer. The flame front will move quickly through the combustion chamber at a rate of more than 8 m/s and no unspent fuel will remain, which may be a problem when the shape of the piston top can lead to dead circulation zones. Further, it is anticipated that the conical jets of fine dispersed water will aid as they vaporize.

At the end of the combustion and after a small downward motion of the piston, generally depending on engine speed, liquid water at high pressure will be injected 6 into the combustion chamber 17 of cylinder 2 and will vaporize, lowering the combustion gas temperature while increasing pressure inside the combustion chamber 17, thereby providing added power pushing the piston 1 downward.

The amount of water entering the cylinder will preferably be nearly equal to—or more—than the mass of the combustion gases, and the water will become superheated steam. The combustion gas/steam mixture will expand adiabatically to a low pressure at bottom dead center and then be pushed out through one or more exhaust valves by the upward moving piston. Several degrees before top dead center the fresh oxidizer (air or $O_2$) will start entering the engine, pushing out any residual combustion gases.

For an ICSE running at 3000 rpm with $H_2$ fuel, the point of water injection will generally be approximately 5° to 40° of the rotation of the crankshaft if the flame front only moves at 8 meters/second. For ICSE running at 1000 rpm, the water injection could even be started at between 5° and 10° past top dead center. If the fuel is hydrogen and the oxidizer is pure oxygen the combustion gases are all steam. If the oxidizer is air, the exhaust gases will be steam and nitrogen. If a hydrocarbon gas or liquid is the fuel, there will result $CO_2$ as well as $N_2$ and steam. There should be little or no $NO_x$ in the exhaust gases as the USDOE (United States Department Of Energy) has shown that even a small amount of water added to a four stroke $H_2$ powered ICE drastically reduces $NO_x$ production. Thus the ICSE with its large water addition should produce no or almost no $NO_x$.

Thermodynamic calculations have shown that an ICSE will produce more power than a standard internal combustion engine with the same fuel-to-air ratio. Since a two-stroke engine delivers one power stroke per piston per engine revolution and a four-stroke engine only has one power stroke per two revolutions, an ICSE half the size of a standard four stroke ICE will produce somewhat more power and will be less polluting. Thus the internal combustion steam engine is more environmentally friendly.

Further, if the head is designed to cover approximately the first 20 to 25 degrees of engine rotation the engine block can potentially be manufactured of lower cost materials.

The power delivered by the new ICSE is significantly higher than that of traditional internal combustion engines. This is due to the formation of superheated steam occurring right after the combustion process, as well as to the added mass and the pressure increase during the expansion process.

Calculations have shown that the combustion gases cool while the water rises in temperature in a near constant volume process (before there is much increase in volume due to downward movement of the piston). Although the volume change is small during the water heating and vaporization, some small expansion will occur. The amount of volume change during this process depends e.g. upon the fineness of the mist and the rpm of the engine.

As a consequence, in a still further preferred embodiment, a novel form of water injector 6 is used whose properties even better respond to the needs of fine mist vaporization. Advantageous injectors will be described further hereafter.

At the end of the expansion, combusted gases will comprise water in the form of fine mist steam, as well as nitrogen if the oxidizer is air instead of pure oxygen ($O_2$).

This will result in a nearly clean engine in terms of emissions.

In traditional ICEs, if the combustion temperature is sufficiently high in ICE using air as combustive, as is usually the case, part of the water that is formed breaks down and in the presence of nitrogen, it is possible for $NO_x$ to form.

The formation of $NO_x$ is an endothermic reaction that cools the gas somewhat and at a given time, the gases come into an equilibrium state which could include $O_2$, O, $NO_x$, $NO_2$, $H_2O$, H, OH, etc.

Of course the combustion gases must have reached sufficiently high temperatures for this to happen and the presence of excess $O_2$, excess air in modest amounts makes it more likely for $NO_x$ to form.

$NO_x$ is a mixture of NO and $NO_2$. Using Gibbs function and temperature one can calculate an equilibrium concentration of the combustion products. It is an iterative calculation and the result is that combusting $H_2$ in air will result in some $NO_x$ being formed if kept isolated so that the gases reach equilibrium.

By adding water to the combusted gases these are cooled while heating the water to vapor phase. This keeps the pressure high while lowering the temperature. Thus, the $NO_x$ hasn't theoretically had the time to form as the temperature drops to a point where it is no longer an equilibrium component. At any rate not as much forms. So the undesirable production of $NO_x$ is definitely lower than in a conventional ICE.

In the thermodynamic calculations it was possible to get the most energy by using a stoichiometric mixture of air and $H_2$ so that there was no excess air.

At complete combustion, a high temperature mixture of $H_2O$ and $N_2$ was formed which, with the adding of the sprayed water, rapidly cooled so that little $NO_x$ is formed.

In a yet further embodiment of an ICSE according to the disclosure, the engine is provided with a particular head, providing pre-heating of the water to be injected in the engine 13, wherein the water to be injected flows through conduits similar to those already existing in normal engines for engine head and cylinder cooling. By providing an appropriate water circulation pace in the ICSE conduits, water is heated and can attain temperatures generally close to its boiling point. This will require less energy produced directly by the combustion to bring water to superheated steam status while utilizing wasted heat energy, which will in turn reduce the quantity of required combustive.

Despite being a two stroke engine, the ICSE features at least one intake valve 3A and one exhaust valve 3B instead of using simple ports (which leads to loss of performance control common to most two stroke engines), at the cost of some weight increase due to the valves and associated actuation system.

An important feature of the ICSE is the water injection system. As indicated above, the shape of the combustion chamber formed by the head and the top of the piston at top dead center preferably forms an ellipse of revolution around its minor axis. The shape of the piston is advantageously made to prevent the occurring of dead circulation zones. In order to take advantage of this feature, water injection nozzles are preferably positioned adequately around the combustion chamber periphery 11 and generally have a fine mist-spraying pattern. As the flame front will tend to move along a vertical downward axis, following the jet injection direction of the combustive, water injectors will advantageously spray at an angle superior to 90 degrees as calculated from a vertical line drawn from the engine head top 12.

The water will be injected after a certain rotation angle of the crankshaft, such as about 5 to 40 degrees from top dead center. This timing preferably ensures the complete combustion of the fuel before water is injected. It is generally assumed that the ignition will take place between 0 and 5 degrees from top dead center. The number and distribution of the water injectors will depend upon their ability to provide a fine mist such as those used to inject fuel in a diesel engine. The presented calculations were conducted for an ICSE turning at 3000 rpm. The amount of water was chosen to be equal in mass to all of the combustion products (equal to the mass of fuel and air). While more water could be injected, the calculations show that this amount will provide significantly more power than simply burning the fuel in air or pure oxygen.

Figure 2:
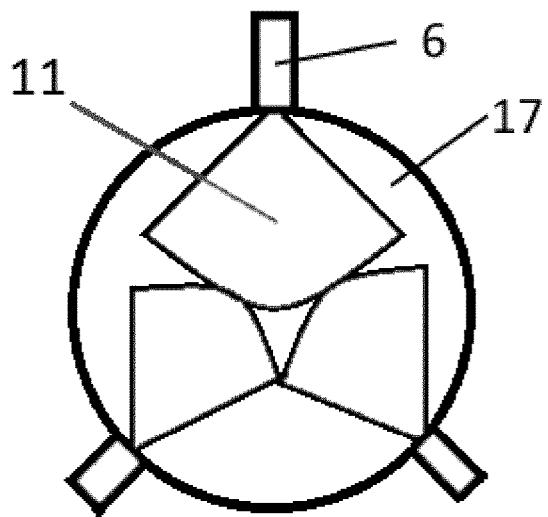
FIG. 2: is a top view of a preferred water Injection pattern
Figure 3:
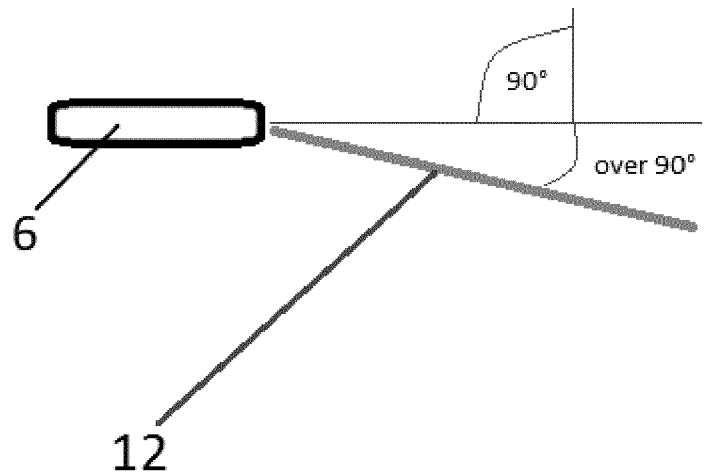
FIG. 3: is a side view of a preferred water injection pattern showing an angle superior to 90°

As can be seen in FIGS. 2 and 3, the water injector-spraying pattern will dictate a location of the water injectors 6 so that these are generally positioned at different locations 11 around the combustion chamber 17, e.g. in a circular fashion. The injectors' nozzles will preferably have a conical spraying pattern as seen from the top of the engine head in FIG. 2. The spraying pattern will, as seen from the injector front, generally define a linear pattern characterized by the nominal injector-spraying angle. This angle will advantageously be defined so as to cover as wide an area as possible as seen from the cylinder head top and is different from the angle defined above dealing with the necessity of having water sprayed downwards in such a way that its direction will follow the downward moving flame front as shown in FIG. 3.

The oxidizer (air or $O_2$) fed to the cylinder intake valve 3A will need to be compressed. In most cases the ICSE will be operated with air instead of pure oxygen, so the ICSE will run with compressed air as an oxidizer. While different means exist to achieving this goal of a compressed gaseous oxidizer supply 9, a compressing device should preferably be located at a distance (such as through an intake compressed air manifold 10) allowing the air mass to be cooled before entering the cylinder. This will have as an effect to feed air with a higher density, which effect will compare favorably with traditional compression engines or even with the so-called Scuderi engines where the compression cylinder and the detent cylinder are generally adjacent. Scuderi engines have paired cylinders, each of which performs two of the tasks (strokes) of a conventional engine. The compression cylinder performs intake and compression. The detent or power cylinder performs combustion and exhaust. Compressed air is transferred from the compression cylinder to the power cylinder through a crossover passage. Fuel is then injected and fired inside the power cylinder to produce the power stroke.

Compressed air can be produced when and as required to directly feed the ICSE. Alternatively, a temporary storage of compressed air can be provided. The compressed air can be actively cooled before (or after) storage by providing a so-called intercooler, typically comprising a heat exchanger. The compressed air within such a heat exchanger may be cooled by ambient air or by the water to be injected to the ICSE.

In preferred embodiments of the disclosure, means are provided to adapt the oxidizer blower or compressed oxidizer storage output volume to the necessity of burning the combustive in a stoichiometric fashion. Various means exist to achieve that goal, including the monitoring of the cylinder head temperature, the analysis and temperature of the exhaust gases, etc. It will be understood that the disclosure can either utilize electrically driven or self-driven compressors whose speed can be varied to meet the stoichiometric combustion demand.

After expansion, the low-pressure steam can be filtered and condensed and made to return to the water tank 7. Water circulation in this instance will generally comprise a water tank 7, a low pressure circulating pump 14 for water pre-heating within water chambers 13 and a high-pressure injection pump 15 leading to the water injectors 6 inside the ICSE.

Figure 5A:
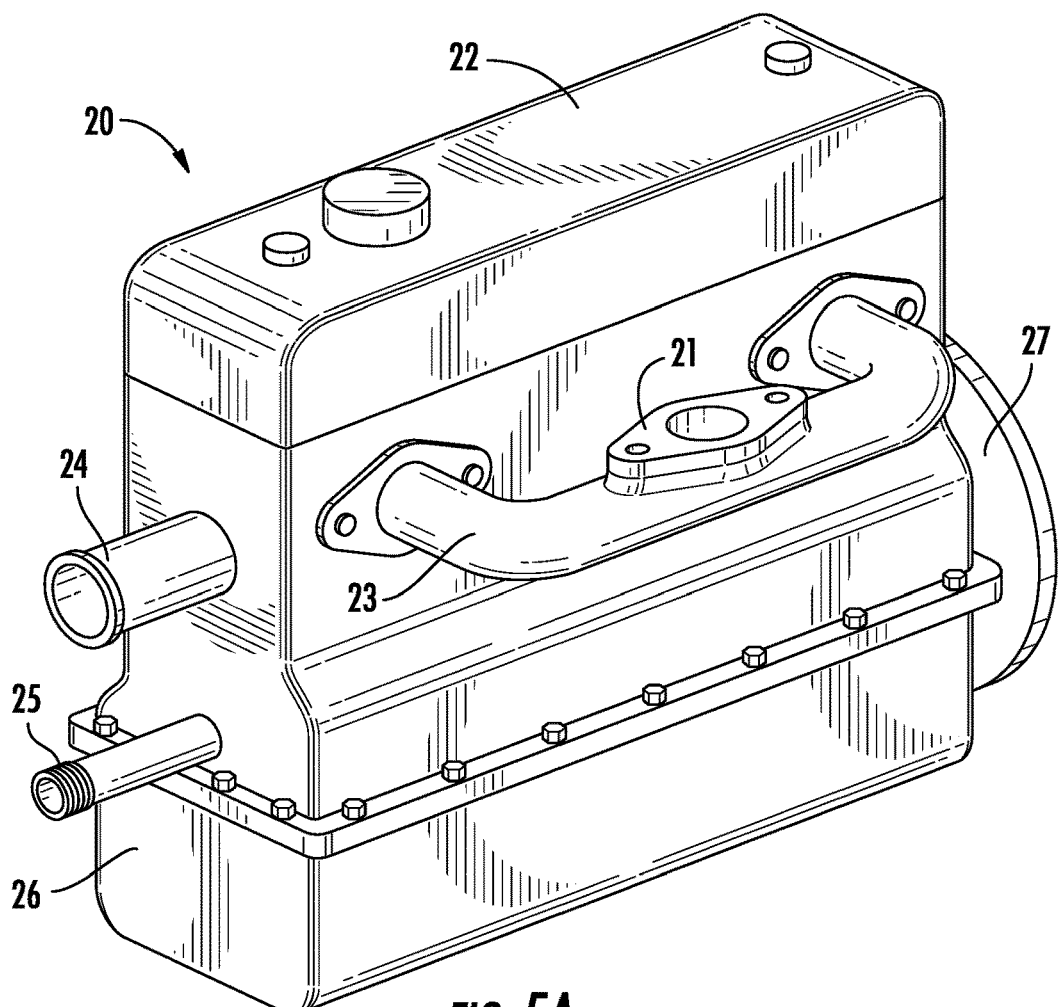
FIG. 5: A to C illustrate an embodiment of an ICSE of the disclosure with among others optional air tank/buffer tank.
Figure 5B:
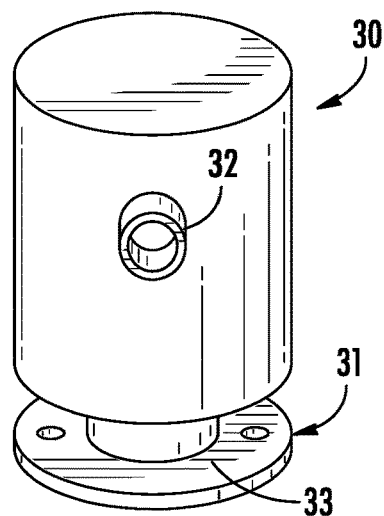
Figure 5C:
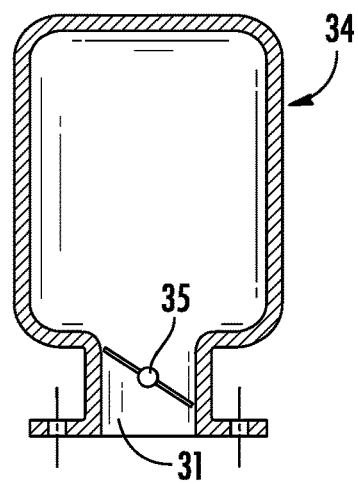

FIG. 5 A shows an embodiment of an ICSE 20 of the disclosure, whereas FIG. 5 B shows an embodiment of an air tank/buffer tank 30 for temporary storage of compressed air (oxidizer). FIG. 5 C is a cross-sectional view of the air tank 30 of FIG. 5 B.

The ICSE 20 comprises a cylinder block with a valve cover 22 at the top and an oil pan 26 at the bottom, a connection 24 for supplying injection water or coolant to the cylinder block, a rotatable crankshaft 25 to which fly wheel 27 is attached. In some embodiments the crankshaft 25 can be operatively connected to a compressor (not shown) for supplying compressed air to the buffer tank 30, an alternator (not shown) and/or a fan (not shown).

The intake manifold 23 is in alternating fluid connection via intake valves with the combustion chamber of each cylinder and further has an air inlet 21 fluidly connected to buffer tank 30. In some embodiments, buffer tank 30 can be mounted directly onto the air inlet 21 by means of a flange 33 and fixing bolts (not shown) in order to fluidly connect the buffer tank volume to the intake manifold 23 through throat 31. The buffer tank 30 for temporary storage of compressed air provided by a compressor via air inlet 32 further comprises a valve, such as butterfly valve 35 to control (throttle) the feeding of compressed air to the combustion chamber of the cylinders via intake manifold 23.

The buffer tank 30 can be made of stainless steel and has an appropriate capacity to hold compressed air at least for filling all cylinders with twice the quantity of air needed per two-stroke cycle. For example, the buffer tank 30 may have a capacity to hold about 4 liters of air compressed at up to 10 bar or more for a 2 liters engine.

The invention claimed is:

1. A sparked reciprocating internal combustion two-stroke steam engine comprising
    an engine casing,
    a crankshaft rotatable about a crankshaft axis,
    a cylinder arranged inside said engine casing,
    a piston arranged inside said cylinder to movably reciprocate along a reciprocating axis between a top dead center position distal from said crankshaft and a bottom dead center position proximal to said crankshaft and operatively connected to the crankshaft such that the reciprocating piston imparts a rotational movement to the crankshaft,
    a combustion chamber defined within said cylinder between the engine casing and a head of the piston opposite said crankshaft,
    an intake valve,
    an exhaust valve,
    a fuel injector to directly inject fuel into said combustion chamber,
    a water injector to directly inject water into said combustion chamber at a location below said top dead center position of the piston; and
    a spark plug,
    wherein the intake valve is in fluid connection with a compressed gaseous oxidizer supply configured to feed compressed gaseous oxidizer through the intake valve to the combustion chamber;
    wherein the sparked reciprocating internal combustion two-stroke steam engine further comprises an actuator configured for opening the exhaust valve to evacuate exhaust gas when the head of the piston is at a reciprocating position between −21° to +15° from bottom dead center and configured for closing said exhaust valve at about 25° to 5° before top dead center position;
    wherein the fuel injector is configured for injecting fuel between −5° to +5° from top dead center; and
    wherein the water injector is arranged at a location below said top dead center position of the piston and is configured for injecting water into the combustion chamber at 5° to 40° after top dead center.

2. The internal combustion two-stroke steam engine according to claim 1, wherein the compressed gaseous oxidizer supplied is compressed oxygen or compressed air at pressure rates of at least 3 to 6 bar.

3. The internal combustion two-stroke steam engine according to claim 1, wherein the compressed gaseous oxidizer supply comprises a compressor; and one or more of a temporary storage and a heat exchanger.

4. The internal combustion two-stroke steam engine according to claim 1, further comprising an actuator configured for opening the intake valve to feed compressed oxidizer when the head of the piston is at a reciprocating position at 90° to 20° before top dead center and configured for closing said intake valve at 10° to 2° before top dead center.

5. The internal combustion two-stroke steam engine according to claim 1, wherein the spark plug is configured for sparking immediately after closing of the fuel injector.

6. The internal combustion two-stroke steam engine according to claim 1, wherein the intake valve and/or the exhaust valve are poppet valves, sliding valves or rotating disk valves.

7. The internal combustion two-stroke steam engine according to claim 1, wherein the fuel is liquid or gaseous at normal conditions.

8. The internal combustion two-stroke steam engine according to claim 7, wherein the fuel comprises hydrogen; methane, ethane, propane, butane or natural gas.

9. The internal combustion two-stroke steam engine according to claim 1, further comprising a control unit configured to control one or more of intake valve opening and closing, exhaust valve opening and closing, timing and quantity of fuel injection, timing and quantity of water injection and oxidizer pressure.

10. The internal combustion two-stroke steam engine according to claim 1, further comprising a water tank as a water supply to feed the water injector and a condenser unit downstream of the exhaust valve to condense steam from exhaust gas to water and conducts to feed said condensed water to the water tank.

11. The internal combustion two-stroke steam engine according to claim 1, wherein the head of the piston facing the combustion chamber has an inwardly curved surface.

12. The internal combustion two-stroke steam engine according to claim 1, comprising a plurality of water injectors distributed along a perimeter of said combustion chamber at a location below said top dead center position, the location below said top dead center position being situated at a location corresponding to the top of the head of the piston when the crankshaft is at an angle of rotation of 0° to 35° relative to the top dead center position.

13. The internal combustion two-stroke steam engine according to claim 1, comprising a plurality of water injectors situated at different locations relative to the reciprocating axis, wherein the water injection of each of said plurality of water injectors can be controlled separately.

14. The internal combustion two-stroke steam engine according to claim 12, wherein the water injector(s) is/are arranged to inject water at an angle of 90° or greater relative to the reciprocating axis in the direction of the top dead center.

15. The internal combustion two-stroke steam engine according to claim 14, wherein the water injector(s) is/are arranged to inject water at an angle between 95° and 130°.

16. The internal combustion two-stroke steam engine according to claim 1, wherein the engine casing comprises a cylinder head and a cylinder block and wherein the cylinder head is configured to cover the distance of the piston head about 25° of crankshaft rotation from the top dead center.

17. The internal combustion two-stroke steam engine according to claim 14, wherein the water injector or a number of water injectors is/are arranged between the cylinder head and the cylinder block.

18. A method of operating a sparked reciprocating two-stroke internal combustion steam engine according to claim 1, said method comprising at each cycle of the rotation of the crankshaft and the corresponding reciprocating of the piston the step of
(a) opening the intake valve to feed compressed oxidizer when the head of the piston is at a reciprocating position at 90° to 20° before top dead center and closing said intake valve between 10° and 2° before top dead center;
(b) opening the exhaust valve to evacuate exhaust gas when the head of the piston is at a reciprocating position between −21° to +15° from bottom dead center, and closing said exhaust valve between 25° to 5° before top dead center position;
(c) injecting fuel between −5° to +5° from top dead center and sparking the spark plug immediately after closing of the fuel injector; and
(d) injecting water into the combustion chamber at 5° to 40° after top dead center.

19. The method according to claim 18, wherein the mass of water injected into the combustion chamber represents 0.8 to 1.5 of the mass of the combustion gases inside the combustion chamber after step (c).

20. The method according to claim 18, wherein the pressure of the compressed oxidizer fed in step (a) is controlled by a control unit.

21. The method according to claim 18, wherein the opening of the intake valve in step (a) is adjusted by a control unit at a value within the range of 90° to 20° before top dead center; and/or the closing of the intake valve in step (a) is adjusted by a control unit at a value within the range of 10° to 2° before top dead center; at each cycle.

22. The method according to claim 18, wherein the opening of the exhaust valve in step (b) is adjusted by a control unit at a value within the range of −21° to +15° from bottom dead center; and/or the closing of the exhaust valve in step (b) is adjusted by a control unit at a value within the range of 25° to 5° before top dead center; at each cycle.

23. The method according to claim 18, wherein the injection of fuel in step (c) is adjusted by a control unit at a value within the range of −5° to +5° from top dead center, at each cycle.

24. The method according to claim 18, wherein the injection of water in step (d) is adjusted by a control unit at a value within the range of 5° to 40° after top dead center, at each cycle.

* * * * *